United States Patent
Kadota

(10) Patent No.: US 10,691,382 B2
(45) Date of Patent: Jun. 23, 2020

(54) INFORMATION PROCESSING DEVICE, METHOD OF CONTROLLING INFORMATION PROCESSING DEVICE, AND NON-TRANSITORY COMPUTER-READABLE RECORDING MEDIUM CONTAINING INSTRUCTIONS REALIZING PRINTER DRIVER

(71) Applicant: BROTHER KOGYO KABUSHIKI KAISHA, Nagoya-shi, Aichi (JP)

(72) Inventor: Masatoshi Kadota, Takahama (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 0 days.

(21) Appl. No.: 16/451,084

(22) Filed: Jun. 25, 2019

(65) Prior Publication Data

US 2020/0004474 A1  Jan. 2, 2020

(30) Foreign Application Priority Data

Jun. 29, 2018 (JP) .................................. 2018-123936

(51) Int. Cl.
*G06F 3/12* (2006.01)

(52) U.S. Cl.
CPC ............ *G06F 3/1229* (2013.01); *G06F 3/121* (2013.01); *G06F 3/1294* (2013.01)

(58) Field of Classification Search
CPC ....... G06F 3/1229; G06F 3/121; G06F 3/1294
See application file for complete search history.

(56) References Cited

U.S. PATENT DOCUMENTS

| 2005/0111856 A1 | 5/2005 | Kawai | |
| 2014/0016160 A1* | 1/2014 | Chigusa | G06F 3/1225 358/1.15 |
| 2015/0178031 A1* | 6/2015 | Kanamori | G06F 3/1205 358/1.15 |

FOREIGN PATENT DOCUMENTS

| JP | 2000-293324 A | 10/2000 |
| JP | 2005-128890 A | 5/2005 |

* cited by examiner

*Primary Examiner* — Quang N Vo
(74) *Attorney, Agent, or Firm* — Scully, Scott, Murphy & Presser, PC

(57) ABSTRACT

A non-transitory computer-readable recording medium for an information processing device contains instructions realizing a printer driver to be executed by the controller. The instructions cause, when executed, the controller to perform receiving data from a particular application, transmitting a request for particular data to the printer through a backend of a CUPS when the data received is a request for the particular data stored in the printer, receiving data from the printer through the backend after transmission of the request for the particular data, determining whether the received data is a response to the particular data when the data is received, and transmitting the data as received to the particular application when the received data is the response to the request for the particular data. Data is repeatedly received until it is determined that the received data is the response to the request for the particular data.

9 Claims, 9 Drawing Sheets

INFORMATION PROCESSING DEVICE, METHOD OF CONTROLLING INFORMATION PROCESSING DEVICE, AND NON-TRANSITORY COMPUTER-READABLE RECORDING MEDIUM CONTAINING INSTRUCTIONS REALIZING PRINTER DRIVER

CROSS-REFERENCE TO RELATED APPLICATIONS

This application claims priority under 35 U.S.C. § 119 from Japanese Patent Application No. 2018-123936 filed on Jun. 29, 2018. The entire subject matter of the application is incorporated herein by reference.

BACKGROUND

Technical Field

The present disclosures relate to an information processing device which is provided with a communication I/F for communicating with a locally connected printer and in which a CUPS (Common Unix Printing System) runs. The present disclosure also relates to a method of controlling the information processing device, and a non-transitory computer-readable recording medium containing instructions which realizes, when executed by a controller of the information processing device, a printer driver for the locally connected printer.

Related Art

There has been known an information processing device in which a printing system according to Windows® runs. There has also been known a technique in which, the information processing device as above obtains particular data from a printer which is locally connected to the information processing device.

SUMMARY

According to the above-mentioned technique, it is possible for an information processing device, in which a printing system of Windows® runs, to obtain particular data from the locally connected printer. However, in the information processing device in which CUPS operates, due to laminations of the CPUS, it is impossible to obtain the particular data from the locally connected printer appropriately.

According to aspects of the present disclosures, there is provided a non-transitory computer-readable recording medium for an information processing device provided with a controller and a communication interface through which the information processing device is connected to a printer, the instructions realizing a printer driver to be executed by the controller, a CUPS being runnable on the information processing device. The instructions cause, when executed, the controller to perform a first receiving process of receiving data from a particular application, a first transmitting process of transmitting a request for the particular data to the printer through a backend of the CUPS when the data received in the first receiving process is a request for particular data stored in the printer, a second receiving process of receiving data from the printer through the backend after transmission of the request for the particular data in the first transmitting process, a first determining process of determining whether the data as received is a response to the request for the particular data when the data is received in the second receiving process, and a second transmitting process of transmitting the data received in the second receiving process to the particular application when it is determined, in the first determining process, that the data is the response to the request for the particular data. Data is repeatedly received in the second receiving process until it is determined, in the first determining process, that the data as received is the response to the request for the particular data.

According to aspects of the present disclosures, there is provided an information processing device which is provided with a communication interface through which the information processing device is connected to a printer and a controller. A CUPS is runnable on the information processing device. The controller is configured to perform a first receiving process of receiving data from a particular application, a first transmitting process of transmitting a request for particular data to the printer through a backend of the CUPS when the data received in the first receiving process is a request for particular data stored in the printer, a second receiving process of receiving data from the printer through the backend after transmission of the request for the particular data in the first transmitting process, a first determining process of determining whether the data as received is a response to the request for the particular data when the data is received in the second receiving process, and a second transmitting process of transmitting the data received in the second receiving process to the particular application when it is determined, in the first determining process, that the data as received is the response to the request for the particular data. Data is repeatedly received in the second receiving process until it is determined, in the first determining process, that the received data is the response to the request for the particular data.

According to aspects of the present disclosures, there is further provided a method of controlling an information processing device provided with a controller and a communication interface through which the information processing device is connected to a printer, the instructions realizing a printer driver to be executed by the controller, a CUPS being runnable on the information processing device. The method includes a first receiving step of receiving data from a particular application, a first transmitting step of transmitting a request for the particular data to the printer through a backend of the CUPS when the data received in the first receiving step is a request for particular data stored in the printer, a second receiving step of receiving data from the printer through the backend of the CUPS after transmission of the request for the particular data in the first transmitting step, a first determining step of determining whether the data as received is a response to the request for the particular data when the data is received in the second receiving step and a second transmitting step of transmitting the data received in the second receiving step to the particular application when it is determined, in the first determining step, that the data is the response to the request for the particular data. Further, data is repeatedly received in the second receiving step until it is determined, in the first determining step, that the data as received is the response to the request for the particular data.

BRIEF DESCRIPTION OF THE ACCOMPANYING DRAWINGS

Figure 1:
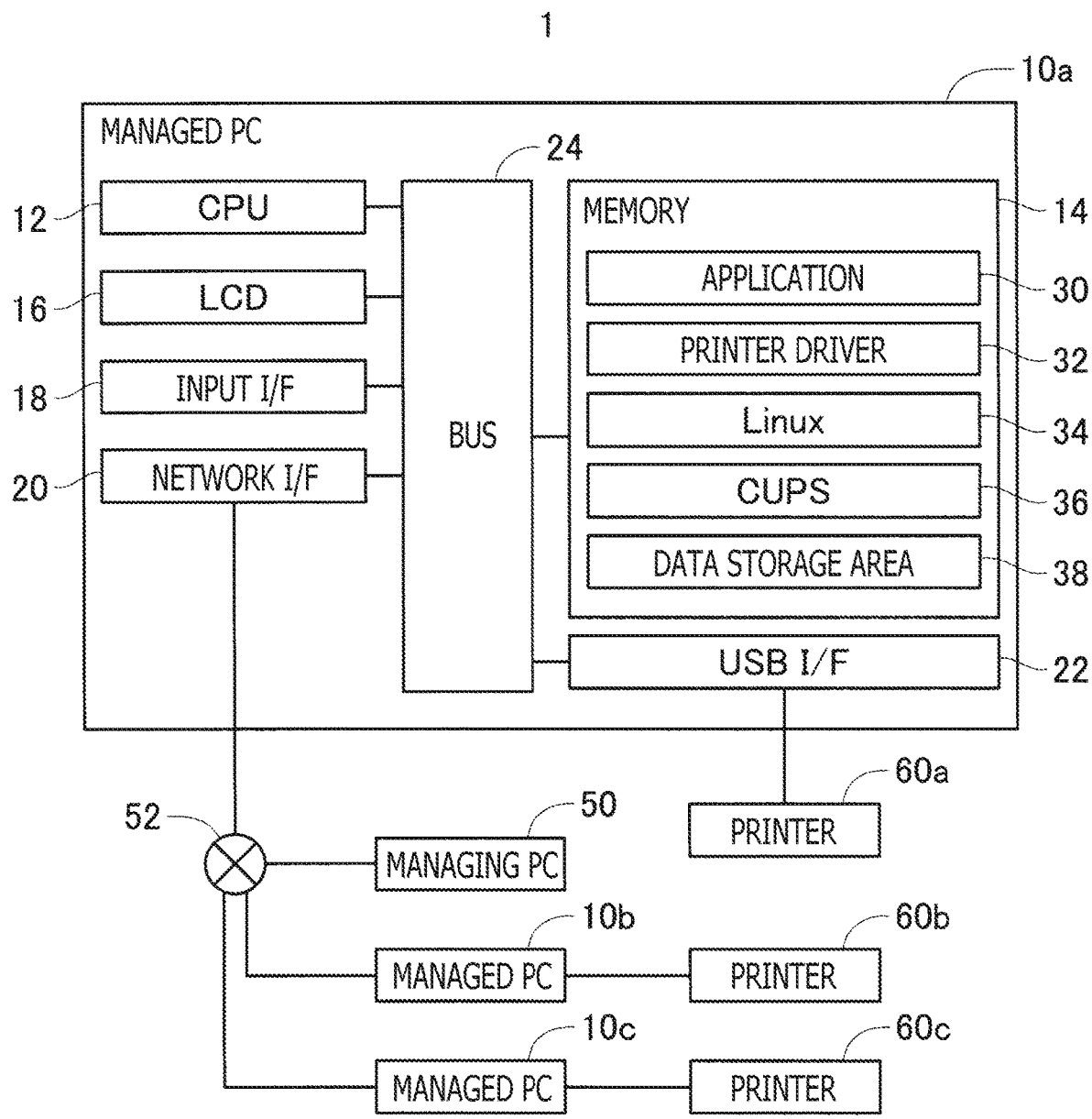
FIG. 1 is a block diagram of a printer system according to a first embodiment of the present disclosures.

FIGS. 3A-3E schematically illustrate transmission/reception of various pieces of information inside the printer system shown in FIG. 1.

Figure 4:
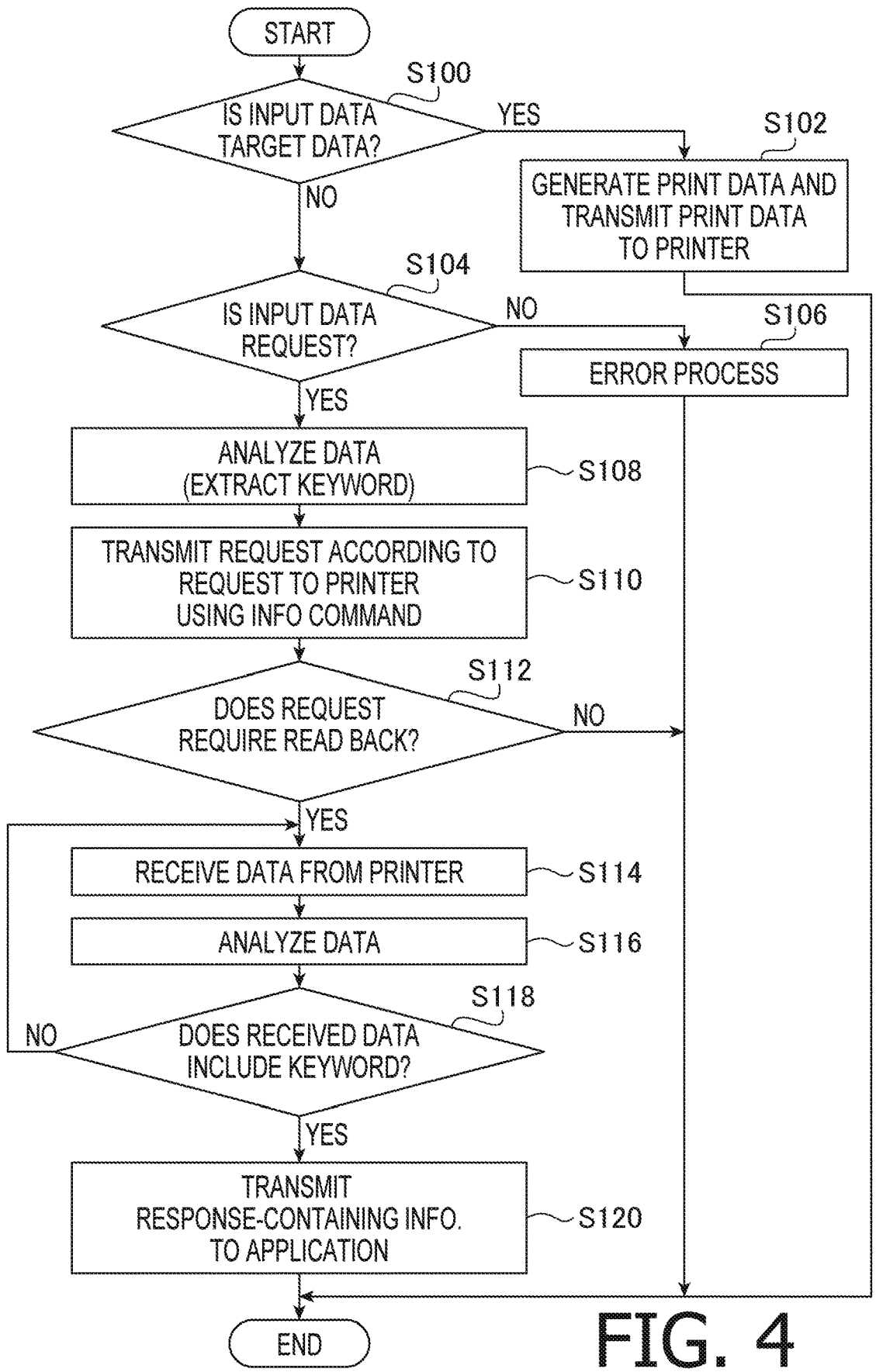

FIG. 4 is a flowchart illustrating an operation of a printer driver according to a first embodiment of the present disclosures.

Figure 5:
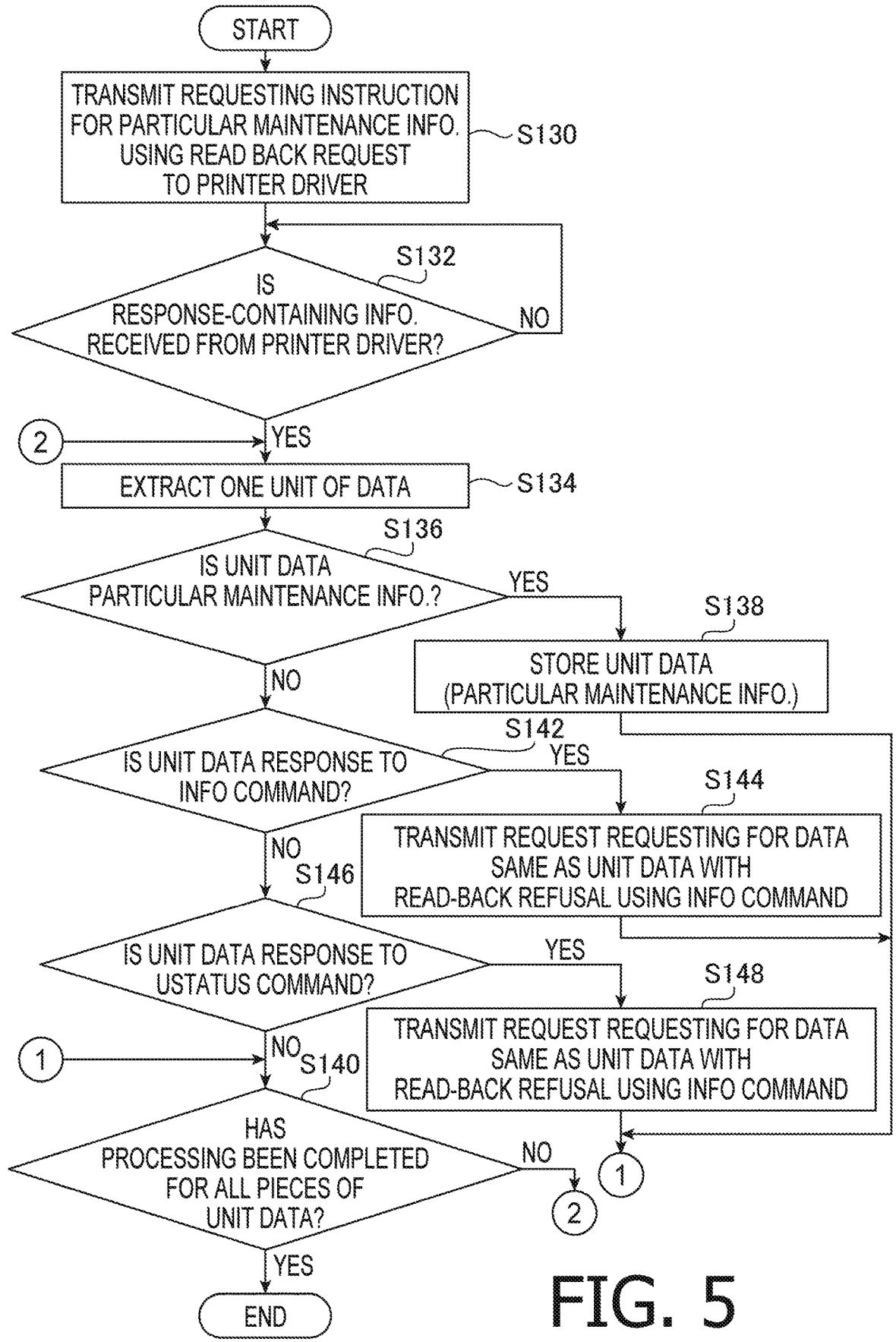

FIG. 5 is a flowchart illustrating an operation of an application according to the first embodiment of the present disclosures.

Figure 6:
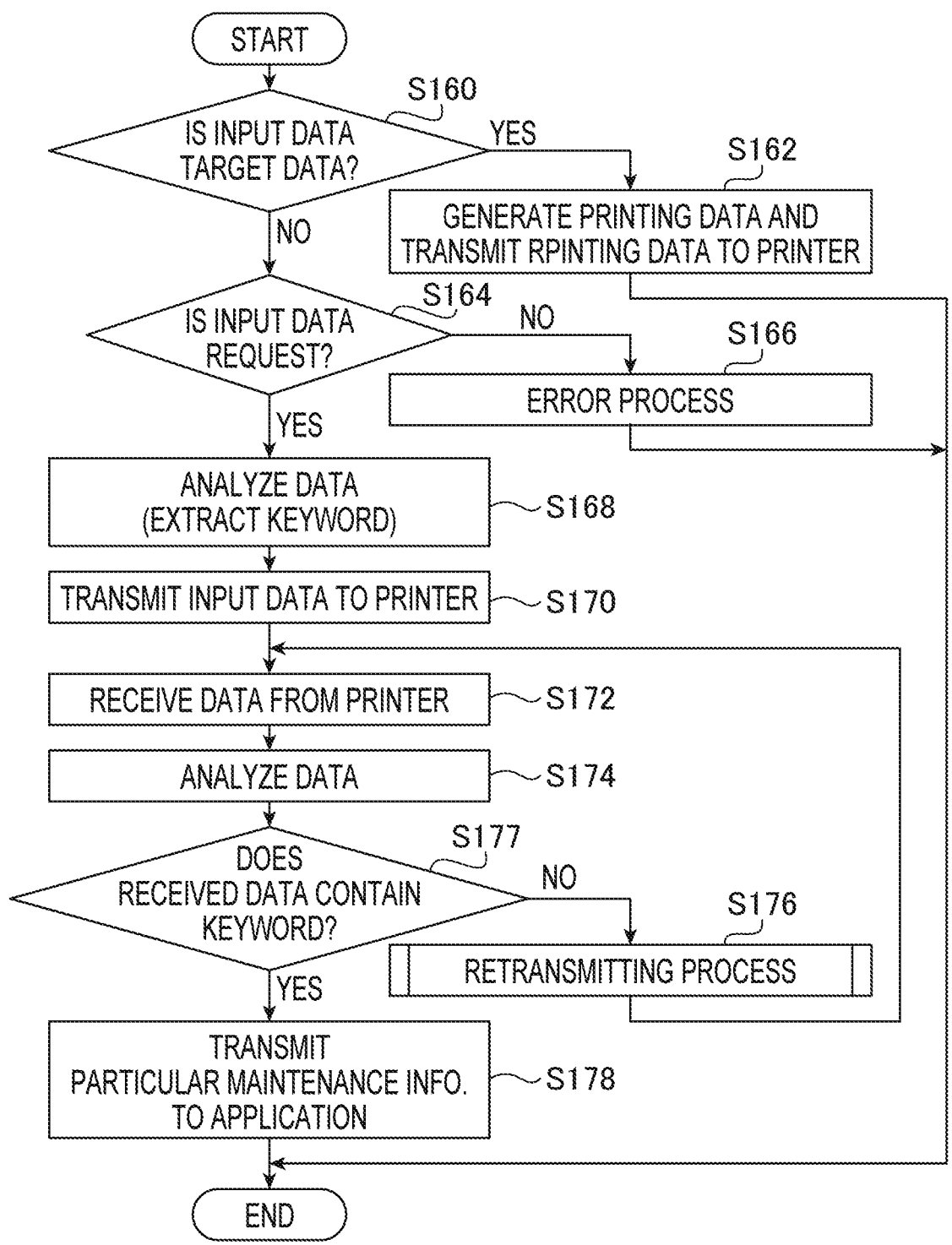

FIG. 6 is a flowchart illustrating an operation of a printer driver according to a second embodiment of the present disclosures.

Figure 7:
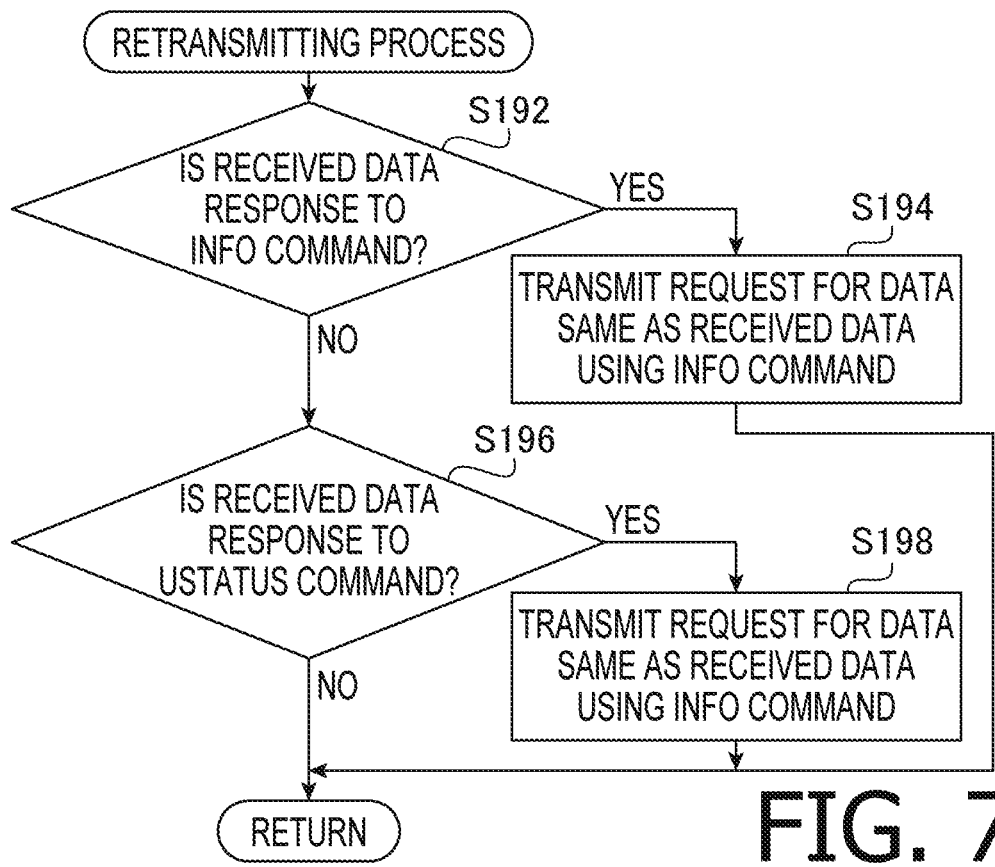

FIG. 7 is a flowchart illustrating a subroutine of a retransmitting process which is called in the flowchart shown in FIG. 6.

Figure 8:
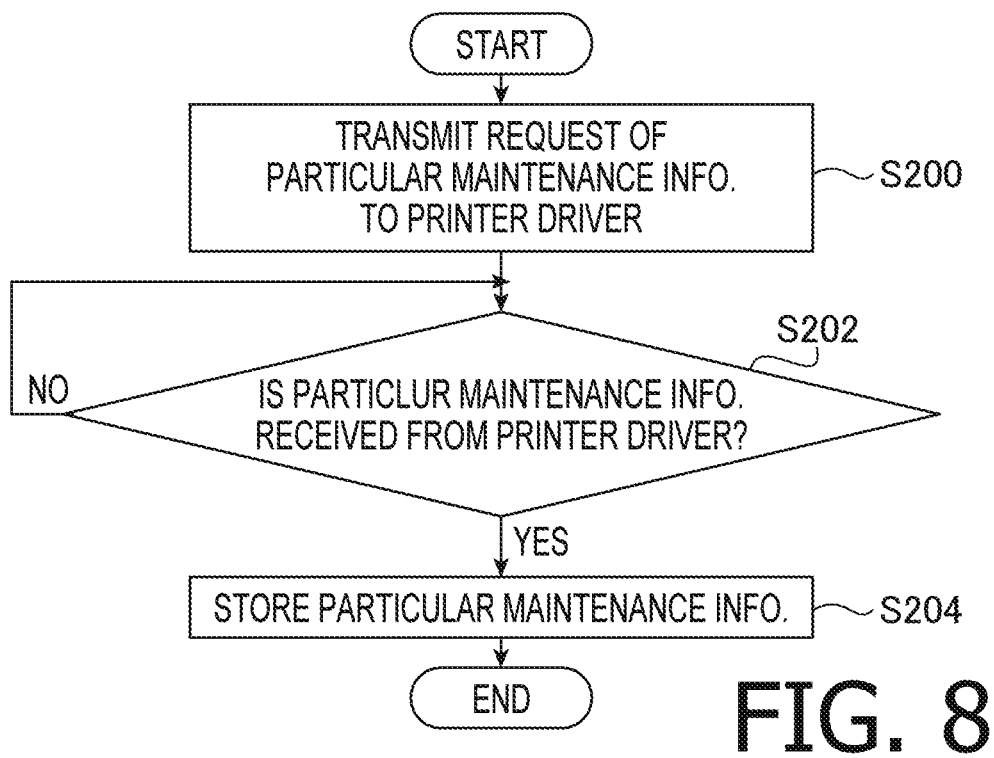

FIG. 8 is a flowchart illustrating an operation of an application according to the second embodiment of the present disclosures.

Figure 9:
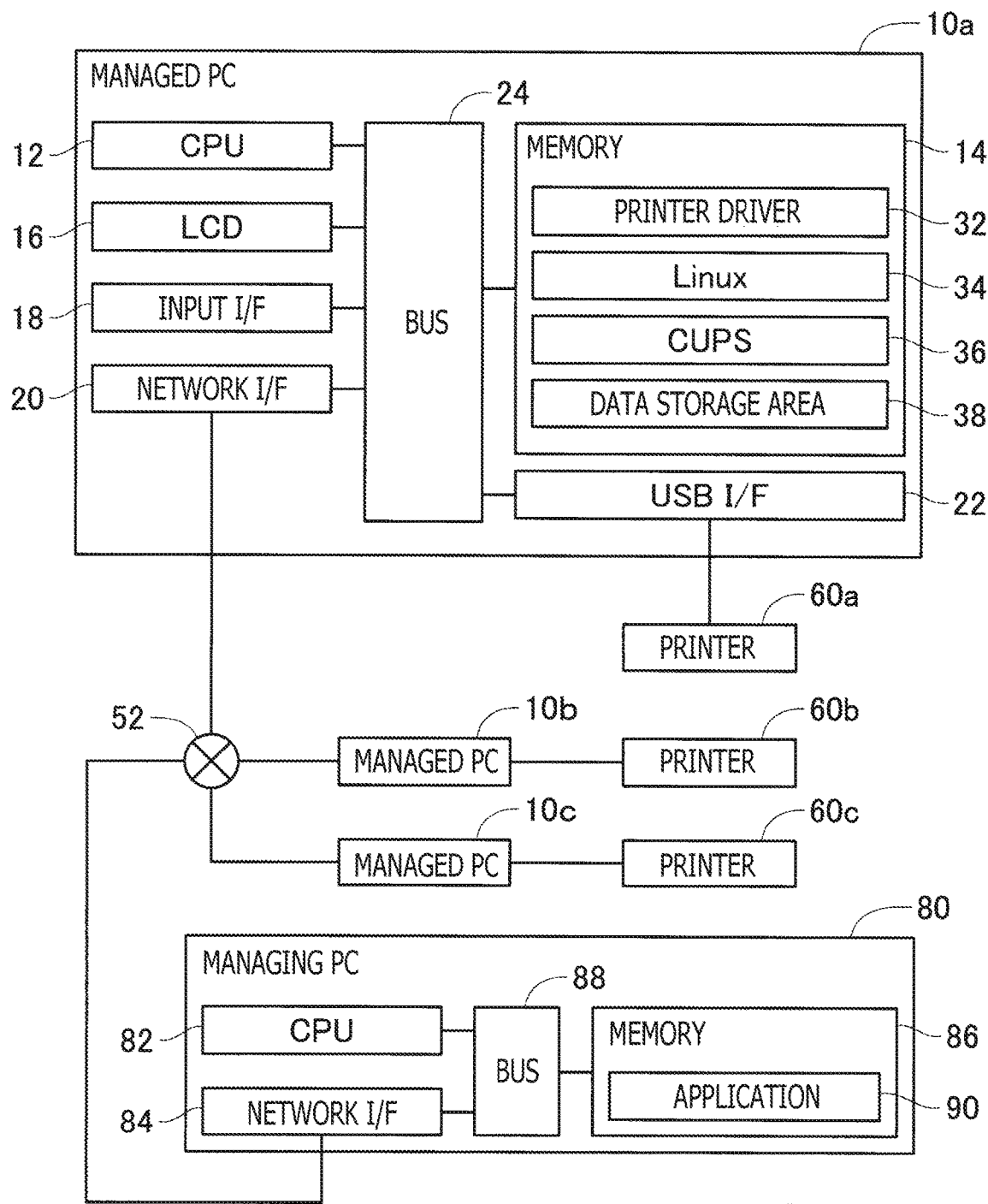

FIG. 9 is a block diagram of a printer system according to a third embodiment of the present disclosures.

Figure 10:
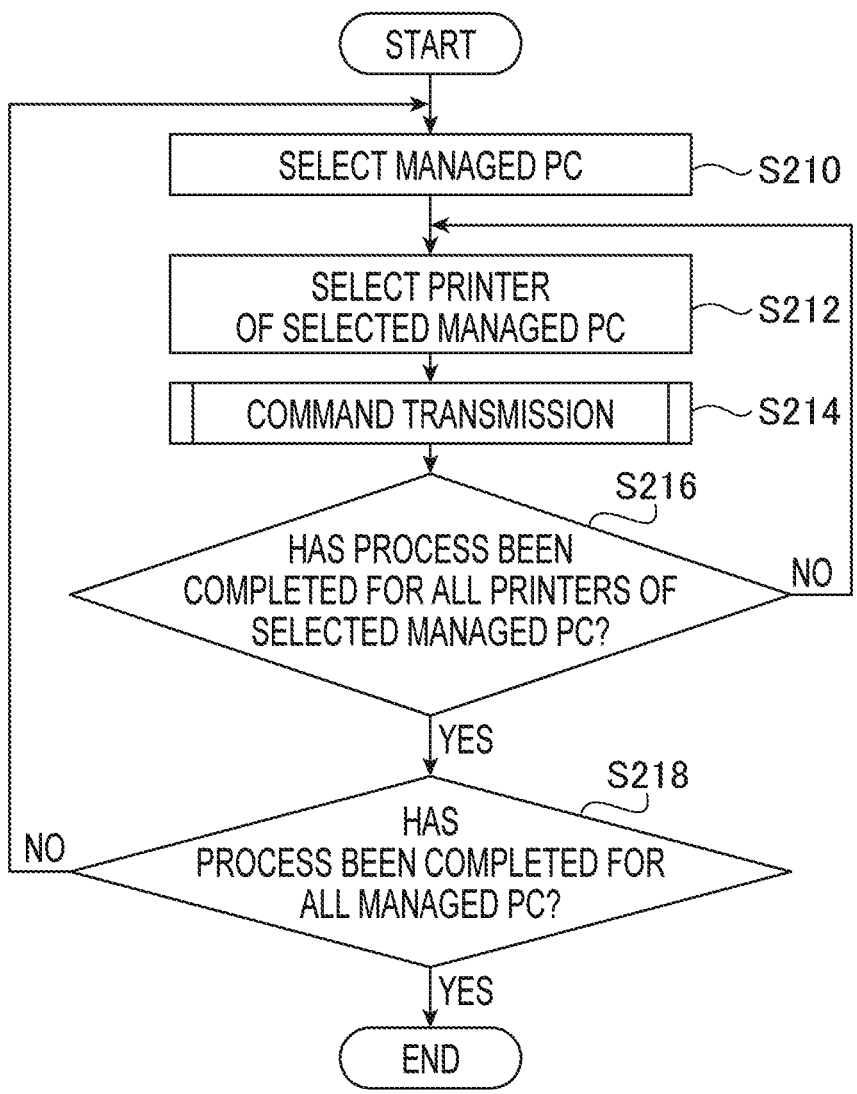

FIG. 10 is a flowchart illustrating an operation of an application according to the third embodiment of the present disclosures.

DETAILED DESCRIPTION OF THE EMBODIMENTS

Hereinafter, referring to the accompanying drawings, embodiments according to the present disclosures will be described. The embodiments described hereinafter are only examples, and various modifications/improvements can be made without departing from aspects of the present disclosures. For example, the order of steps of respective flowcharts may be changed without changing aspects of the present disclosures.

First Embodiment

FIG. 1 is a block diagram showing a printer system 1 according to a first embodiment of the present disclosures. The printer system 1 shown in FIG. 1 includes three managed PC's 10a, 10b and 10c, one managing PC 50 and three printers 60a, 60b and 60c. Each of the managed PC's 10a, 10b and 10c has substantially the same configurations. Accordingly, only the managed PC 10a will be described representatively. Regarding the managed PC's 10b and 10c, only portions different from the managed PC 10a will be described.

The managed PC 10a mainly includes a CPU 12 (which is an example of a controller), a memory 14, an LCD 16, an input I/F 18, a network I/F 20, a USB I/F 22 (which is an example of a communication interface), which are communicable with each other through a bus 24.

The managed PC 10a is configured to communicate with the managing PC 50 through the network I/F 20 and the network 52. As a communication method, for example, a wired LAN and/or Wi-Fi® may be employed. The managed PC 10a is communicable with the printer 60a through the USB I/F 22. It is noted that the managed PC 10b is communicable with the printer 60b, and the managed PC 10c is communicable with the printer 60c. As a communication protocol for communication between the printers 10a-10c and the printers 60a-60c, for example, Printer Job Language® (hereinafter, referred to as PJL®) may be employed.

The CPU 12 executes processes in accordance with an application 30, a printer driver 32, Linux® 34, CUPS® 36, which are stored in the memory 14. The application 30 is a program for obtaining maintenance information of the printer 60a, which is communicable with the managed PC 10a. The printer driver 32 is a driver for the printer 60a. The printer driver 32 is a program configured to transmit image data for printing to the printer 60a. The Linux 34 is an operating system of the managed PC 10a and provides basic functions which are used by application 30 and the printer driver 32. The CUPS 36 is a printing system employed in the Linux® 34. In the following description, the CPU 12 executing the printer driver 32 will occasionally be referred to only by the name of the program (i.e., the printer driver 32). That is, there are cases where an expression "the printer driver 32 performs . . . " is intended to mean "the CPU 12 executing the printer driver 32 performs . . . ".

Figure 2:
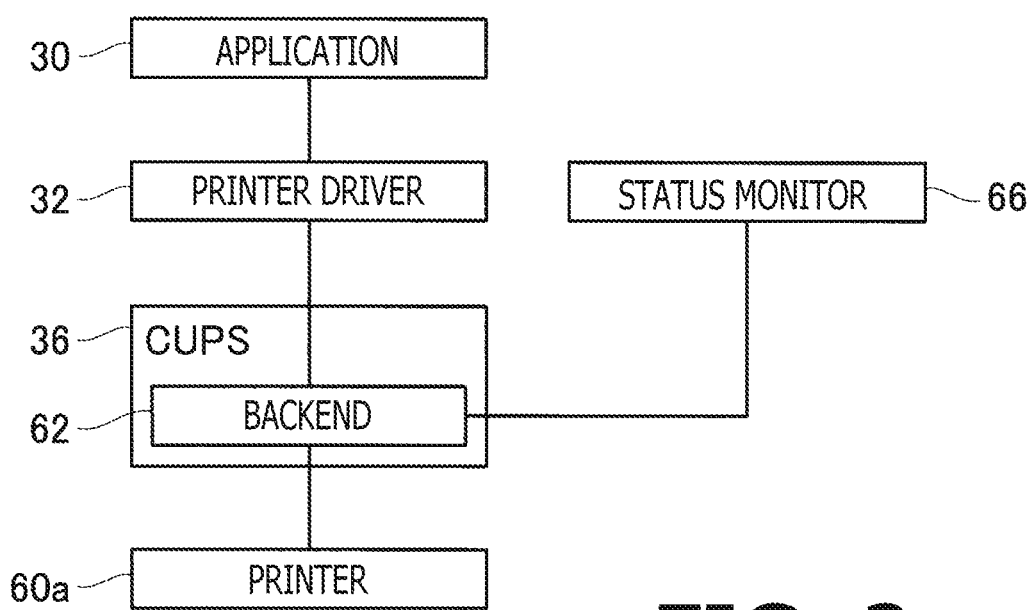
FIG. 2 is a functional block diagram illustrating a functional relationship among an application, a printer driver, a backend of CUPS, a printer and a status monitor.

FIG. 2 shows a conceptual block diagram illustrating a functional relationship among the application 30, the printer driver 32, the CUPS 36 and the printer 60a. The application 30 performs transmission/reception of informing to/from the printer driver 32. The printer driver 32 performs, through the backend 62 of the CUPS 36, transmission/reception of information to/from the printer 60a. The managed PC 10a has a status monitor 66 which is used to monitor an operation status of the printer 60a. The status monitor 66 performs transmission/reception of information, through the back end of the CUPS 36, to/from the printer 60a. Thus, the status monitor 66 receives information indicating the operation state of the printer 60a (hereinafter, referred to as "status information") from the printer 60a through the backend 62.

As shown in FIG. 1, the memory 14 has a data storage area 38. The data storage area 38 is an area configured to store data necessary for execution of the printer driver 32. According to the embodiment, the memory 14 is configured to be a combination of a RAM, a ROM, a flash memory, an HDD, a portable storage such as a USB memory detachably attached to the managed PC 10a and a buffer of the CPU 12.

It is noted that the memory 14 may be a computer-readable storage medium. The computer-readable storage medium is a non-transitory medium. Examples of the non-transitory storage medium include a recording medium such as a CD-ROM and a DVD-ROM. Further, the non-transitory medium is also a tangible medium. In contrast, an electrical signal carrying a program downloaded from a server on the Internet is a computer-readable signal medium which is one type of the computer readable medium but not categorized as the non-transitory computer readable medium.

The LCD 16 is configured to display various pieces of information regarding the PC 10a. It is noted that the display according to the embodiments need not be limited to the LCD, but could be of any other types of displays such as an organic EL display. The input I/F 18 is an interface through which user operations are input and includes, for example, a keyboard and a mouse. It is noted that the input I/F 18 need not be limited to one having the keyboard, but one provided with a film-like touch sensor overlaid on a display screen of the LCD 16.

In the printer system 1, with the above-described configurations, each the managed PC's 10a, 10b and 10c receives maintenance information from corresponding one of the communicable printers 60a, 60b and 60c, and stores the received maintenance information in the memory 14. The managing PC 50 is configured to read out the maintenance information stored in the memory 14 at a particular timing. According to the above configuration, in the managing PC 50, the maintenance information of the printers 60a, 60b and 60c is managed in an integrated fashion.

Hereinafter, processes performed in the printer system 1 will be described in detail. It is noted that, in the present specification, processes performed by the CPU 12 in accordance with instructions described in programs will be described basically. That is, processes to "judge", "extract", "select", "calculate", "determine", "identify", "obtain", "receive", "control" and "set" described in the in the specification indicate processes performed by the CPU 12. The processes performed by the CPU 12 include a hardware control through the Linux 32. It is noted that the term "obtain" is used to include a concept of obtaining without a request. That is, a process of obtaining data without a request by the CPU 12 is included within the concept that the "CPU 12 obtains data".

Further, a term "data" in the specification is used to mean a bit string which is readable by a computer. Two pieces of data having the same meaning but different formats will be treated as the same data. So is the term "information" in the specification. Further, processes to "order", "respond", "request" and the like are performed by transmitting/receiving information representing the "order", "respond", "request" and the like, respectively. Furthermore, the terms "order", "respond", "request" and the like may be used to mean information itself representing "order", "respond", "request" and the like, respectively.

Further, a process, performed by the CPU, of determining "whether or not information A indicates a matter B" may be described conceptually such that "whether a matter is a matter B or not is determined based on information A". Similarly, a process, performed by the CPU, of determining "whether information A indicates a matter B or a matter C" may be described conceptually such that "whether a matter is a matter B or a matter C is determined based on information A".

In the printers 60a, 60b and 60c, as the maintenance information, information indicating remaining amounts of consumables (e.g., toner), information indicating the number of printed sheets and the like are stored. The printer drivers 32 of the managed PC's 10a, 10b and 10c obtain the maintenance information from the printers 60a, 60b and 60c, respectively. However, since the managed PC's 10a, 10b and 10c employ the Linux 34 as the operating system, the maintenance information cannot be obtained from the respective printers 60a, 60b and 60c appropriately in accordance with a method conventionally employed in the Windows®. The Linux 34 uses the CUPS 36 as the print system. Therefore, the printer driver 32 and the backend 62 of the CUPS 36 are different processes, and the backend 62 is started for every print job, and the process is ended at the end of the print job. Therefore, the printer drivers 32 of the managed PC's 10a, 10b and 10c cannot obtain the maintenance information from the respective printers 60a, 60b and 60c. In contrast, a PC employing the Windows® as its operating system is configured to obtain the maintenance information in one process. Accordingly, even if each process has already been completed, the maintenance information can be obtained appropriately. In each the managed PC's 10a, 10b and 10c, which employs the Linux 34 as its operating system, the printer driver 32 does not terminate the process until the maintenance information is obtained so that the maintenance information can be appropriately obtained.

Concretely, for example, in the managed PC 10a, the application 30 transmits an instruction to request particular maintenance information (hereinafter, referred to as "particular maintenance information", which is an example of particular data) to the printer driver 32 with a read-back request. It is noted that the "read-back request" is for allowing the printer driver 32 to read and obtain information from the printer 60a (described in detail later). When the printer driver 32 received a request containing an option "with a read-back request", the printer driver 32 receives information from the printer 60a in accordance with the request to the printer 60a. Opposite to the option "with a read-back request", there is an option "with a read-back refusal", which will also be described in detail later. The option "with a read-back refusal" is for prohibiting the printer driver 30 from reading and obtaining information from the printer 60a. When a request containing the option "with a read-back refusal" is received, the printer driver 32 does not receive information from the printer 60a in accordance with the request instruction to the printer 60a.

It is noted that the application 30 transmits the request of the particular maintenance information with the read-back request to the printer driver 32 at every particular period. Then, when the request for the particular maintenance information is received, the printer driver 32 transmits the request for the particular maintenance information to the printer 60a through the backend 62. Concretely, when, for example, the particular maintenance information is information regarding the number of sheets and the remaining amount of toner, two commands "@PJL INFO PAGE" and "@PJL INFO TONNER" are included in the request for the particular maintenance information.

These commands are called as INFO commands based on the PJL language (which are examples of a first command) The commands are for instructing transmission of the maintenance information designated by the command That is, "@PJL INFO PAGE" is an INFO command instructing transmission of information on the number of prints, and "@PJL INFO TONNER" is an INFO command instructing transmission of information on the remaining amount of toner. When receiving the INFO command, the printer 60a transmits the maintenance information designated by the command, that is, the particular maintenance information, to the printer driver 32 through the backend 62 at a timing when the INFO command is received. Accordingly, the printer driver 32 obtains the particular maintenance information corresponding to the request of the application 30 from the printer 60a and transmits the thus obtained particular maintenance information to the application 30.

When the printer driver 32 transmits the information to the application 30, the process on the printer driver 32 side is completed, and transmission/reception of information with the printer 60a is cut off. The cut-off status between the printer driver 32 and the printer 60a is maintained until a new process is started. That is, the printer driver 32 cannot receive information from the printer 60a after transmitting the information to the application 30. It is because, as mentioned above, the printer driver 32 and the backend 62 of the CUPS 36 are separate processes.

When the printer driver 32 has obtained the particular maintenance information from the printer 60a and transmitted the same to the application 30, there would be no problem. However, when the printer driver 32 obtains information (hereinafter, referred to as "differing information", which is an example of differing data) which is different from the particular maintenance information from the printer 60a and transmits the differing information to the application 30, the transmission/reception between the printer driver 30 and the printer 60 is cut off, with the printer driver 32 not obtaining the particular maintenance information. That is, the printer driver 32 cannot obtain the particular maintenance information corresponding to the request received from the application 30.

It is noted that an example of the differing information is the status information. As mentioned in detail above, in the managed PC 10a, an operation status of the printer 60a is monitored by the status monitor 66. Therefore, the status monitor 66 transmits a request for the status information to the printer 60a in order to receive information indicating the operation status of the printer 60 (i.e., the status information) from the printer 60a. The request includes a command "@PJL USTATUS DEVICE ON". This command is called as a USTATUS command based on the PJL language (which is an example of a second command) The USTATUS command is for instructing transmission of the status information at a timing when the operating status of the printer is changed. It is noted that the status information includes "PRINT", "READY" and "SLEEP". The command "PRINT" indicates that the printer 60a is perming printing operation. The command "READY" indicates that the printer 60a is in a ready (i.e., standby) state. The command "SLEEP" indicates that the printer 60a is in a sleeping state. When receiving a request including the USTATUS command, the printer 60a transmits the status information to the status monitor 66 through the backend 62 every time when the operation status of the printer 60a changes. That is, for example, when the printer 60a becomes in the standby state after the printing process has completed in the printer 60a, the status information "READY" is transmitted to the status monitor 66. As above, according to the managed PC 10a, the operation status of the printer 60a is monitored by the status monitor 66.

There could be a case where the status information transmitted by the printer 60a through the backend 62 is not received by the status monitor 66, but received by the application 30 through the printer driver 32. In such a case, the status information output by the printer 60a as a response to the USTTUS command received from the status monitor 66 serves as the differing information. After transmitting the request for the particular maintenance information to the printer 60a, the printer driver 32 receives the status information and then transmits the received status information to the application 30, as mentioned above, the printer driver 32 cannot obtain the particular maintenance information.

Therefore, when receiving the request for the particular maintenance information from the application 30, the printer driver 32 analyzes the request and extracts a keyword for recognizing the particular maintenance information. If the particular maintenance information is information regarding the number of prints, the printer driver 32 extracts "PAGE" as the keyword. Then, in accordance with the request received from the application 30, the printer driver 32 transmits a request including the INFO command to the printer 60a. That is, only when "PAGE" is extracted as the keyword, the printer driver 32 transmits "@PJL INFO PAGE" to the printer 60a.

When receiving the information, the printer driver 32 analyzes the received information, and determines whether a keyword is included in the information. For example, when the printer driver 32 receives the information regarding the number of prints from the printer 60a, the printer driver 32 analyzes the contents of the received information in accordance with the grammar of the PJL, and determines that the keyword "PAGE" is included and that the keyword is the response to the command "@PJL INFO PAGE" which is received from the application 30. Then, the printer driver 32 transmits the received information, that is, the information regarding the number of prints to the application 30. By transmitting the information to the application 30, the printer driver 32 becomes unable to receive the information from the printer 60a. However, no problem arises since the printer driver 32 has already received the information regarding the number of prints, that is, the particular maintenance information corresponding to the INFO command.

When the printer driver 32 receives the status information from the printer 60a, the printer driver 32 determines that a keyword is not included in the received information since the received status information is analyzed, according to the PJL grammar, and is determined that the keyword "PAGE" in the form of a response to the INFO command "@PJL INFO PAGE" is not included therein. In this case, the printer driver 32 does not transmit the received information, that is, the status information to the application 30. As above, when the received information does not correspond to the request of the application 30, the printer driver 32 does not transmit the received information to the application 30. According to the above configuration, the printer driver 32 can receive information continuously from the printer 60a.

When the printer driver 32 receives the information regarding the number of prints after receiving the status information, since the keyword "PAGE" is included in the information in the form of a response to the INFO command "@PJL INFO PAGE", the printer driver 32 determines that the received information includes the keyword. In this case, the printer driver 32 transmits the information regarding the number of prints to the application 30. It is noted that the printer driver 32 transmits not only the information regarding the number of prints but all the pieces of received information to the application 30. That is, when the printer driver 32 has received the status information before receiving the information regarding the number of prints, the printer driver 32 transmits all the pieces of information including the information regarding the number of prints and the status information to the application 30. Hereinafter, all the information transmitted to the application 30 will be collectively referred to as response-containing information.

As above, until the information corresponding to the request by the application 30 is received, that is, until the particular maintenance information is received, the printer driver 32 does not transmit the received information to the application 30. After receiving the particular maintenance information, the printer driver 32 transmits the received information to the application 30. Accordingly, the particular maintenance information can be obtained from the printer 60a.

In the description above, the status information is described as an example of the differing information. It should be noted that there could be a case where the maintenance information is the differing information. For example, there could be a case where the information regarding the number of prints is the information responding to the request from the application 30, but the information regarding the remaining mount of the toner is transmitted from the printer 60a. Such a situation occurs since, for example, the information regarding the remaining amount of the toner is requested by a program which is different from the application 30. In such a case, when receiving the information regarding the remaining amount of the toner, the printer driver 32 determines whether the received information includes the keyword "PAGE". At this stage, since the keyword "PAGE" is not included in the information regarding the remaining amount of the toner, it is determined that the received information does not include a keyword. That is, the information regarding the remaining amount of the toner is determined to be the differing information, the printer driver 32 does not transmit the information regarding the remaining amount of the toner, but continues to receive the information transmitted from the printer 60a. According to the above configuration, even if the printer driver 32 receives the maintenance information, and the maintenance information is not the particular maintenance information (e.g., the information responding to the request by the application 30), the printer driver 32 can keep receiving the information from the printer 60a until the printer driver 32 receives the particular maintenance information.

Since the printer driver 32 is a driver for the printer 60a, not only the above-described maintenance information of the printer 60a but image data of a general target object (hereinafter, referred to as "target data") to be printed by the printer 60a are input to the printer driver 32. Therefore, if certain information is input, the printer drive 32 determines whether the input information is the target data. It is noted that the determination is made based on whether or not the data format of the input information is, for example, one of a PS format, a PDF format, a JPEG format and the like. Further, when it is determined that the input information is the target data, the printer driver 32 converts the target data to printing image data which can be printed by the printer 60a, and transmits the converted printing image data to the printer 60a.

When it is determined that the input information is not the target data, the printer driver 32 determines whether the input information is a request to the printer 60a. At this stage, the printer driver 32 determines whether or not the input information is information based on the PJL language (e.g., the INFO command) When it is determined that the input information is information based on the PJL language, the printer driver 32 determines that the input information is the request to the printer 60a. As such, when it is determined that the input information is the request to the printer 60a, the printer driver 32 transmits a request for the maintenance information including the INFO command to the printer 60a according to the above-described process.

When it is determined that the input information is not information based on the PJL language, the printer driver 32 determines that the input information is not the request to the printer 60a. In this case, the input information is treated as invalid data which is neither the target data nor the request, and an error process is performed.

When receiving the response-containing information transmitted by the printer driver 32, the application 30 extracts the particular maintenance information contained in the response-containing information and stores the extracted particular maintenance information. It should be noted that, as mentioned above, there could be a case where the response-containing information contains not only the particular maintenance information but also the status information. Originally, the status information is information which should be used in the status monitor 66. Therefore, when the application 30 receives the status information, the status monitor 66 may not monitor the operation status of the printer 60a appropriately.

Figure 3:
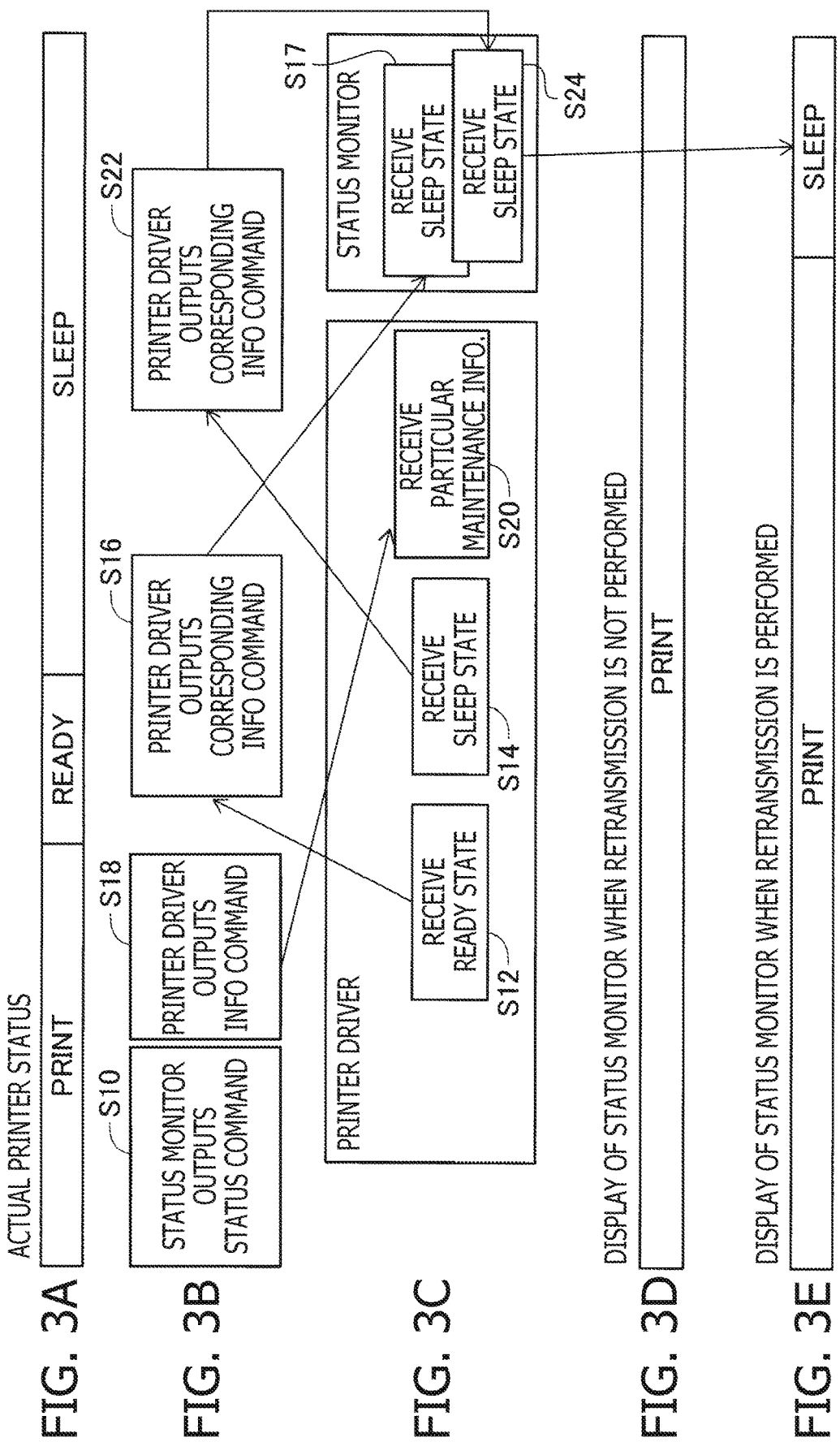

Concretely, when the status monitor 66 outputs the USTATUS command (FIG. 3B, S10), the printer 60a outputs a "READY" state as status information at a timing when the operating status thereof has been changed from a printing state (i.e., "PRINT") to a standby state (i.e., "READY") (see FIG. 3A). In this case, when the printer driver 32 receives the status information (FIG. 3C, S12), the status monitor 66 cannot receive the status information indicating the "READY" state. Then, the printer driver 32 cannot change the operating status of the printer 60a to the "READY" state. Further, the printer 60a outputs a "SLEEP" state as the status information at a timing when the operating status thereof has been changed from the "READY" state to the "SLEEP" state. In this case, when the printer driver 32 receives the status information indicating the "SLEEP" state (FIG. 3C, S14), the status monitor 66 cannot received the status information indicating the "SLEEP" state. Then, the printer driver 32 cannot change the operating status of the printer 60a to the "SLEEP" state. Therefore, as shown in FIGS. 3A-3C, although the actual operating status of the printer 60a changes from the "PRINT" state to the "READY" state and then to the "SLEEP" state, the status monitor 66 determines that the operating status of the printer 60a has not been changed from the "PRINT" state as shown in FIG. 3D, which indicates display of the status monitor 66 when retransmission is not performed.

Therefore, when receiving the response-containing information from the printer driver 32, the application 30 determines whether the received response-containing information contains the status information. When it is determined that the status information is contained, the application 30 performs retransmission of the status information. That is, there is a possibility that the response-containing information contains a plurality of pieces of information including the particular maintenance information. Therefore, the application 30 analyzes the response-containing information in accordance with the PJL grammar to extract data of one unit (hereinafter, referred to as "unit data"). Then, the application 30 determines whether the unit data is the particular maintenance information. When it is determined that the unit data is the particular maintenance data, the application 30 stored the unit data, or the particular maintenance information in the data storage area 38. It is noted that the term "unit" used throughout the specification is compliant to the grammar of the PJL.

When the unit data is not the particular maintenance data, the application 30 determines whether the unit data is the status information. At this stage, the application 30 determines whether or not the unit data is a response to the USTATUS command. When the unit data indicates the operating status of the printer 60a, for example, the "READY" state, the unit data is regarded to contain the response to the USTATUS command, and it is determined that the unit data is the status information. When the unit data is determined to be the status information, the application 30 transmits the request using the INFO command requesting for the same data as the unit data to the printer drive 32. That is, when the unit data is the status information indicating the "READY" state, the application 30 transmits, using the INFO command, the request requesting for the status information to the printer driver 32 with the read-back refusal.

When receiving the request, using the INFO command, requesting for the status information with the read-back refusal, the printer driver 32 transmits the request for the status information including the INFO command to the printer 60a (S16). With this configuration, the printer 60a transmits the status information at a timing when the request is received. It should be noted that, since the request is transmitted with the read-back refusal, the printer driver 32 does not receive the response corresponding to the request as described above. Accordingly, the status information is received by the status monitor 66 (S17).

When the printer driver 32 transmits the request, which contains the INFO command, for the particular maintenance information to the printer 60a (S18), the communication between the printer driver 32 and the printer 60a is not cut off until the printer driver 32 receives the particular maintenance information. Accordingly, the printer 60a transmits the status information after the printer driver 32 receives the particular maintenance information (S20), and the status information is received by the status monitor 66. It is noted that, when the status information is transmitted, the operating status of the printer 66 is the "SLEEP" state. Therefore, the printer 60a transmits, as the status information, the "SLEEP" state, and the status monitor 66 receives the "SLEEP" state as the status information.

In the example shown in FIG. 3C, the printer driver 32 receives the "SLEEP" state after receiving the "READY" state. Accordingly, in the response-containing information transmitted to the application 30, both the "READY" state and the "SLEEP" state are contained. Therefore, after transmitting the request of the status information to the printer driver 32 using the INFO command, the application 30 transmits the request for the status information again to the printer driver 32 using the INFO command with the read-back refusal. Then, when the printer driver 32 receives the request for the status information using the INFO command, the printer driver 32 transmits the request for the status information including the INFO command to the printer 60a again (S22). According to this configuration, the printer 60a transmits the status information at a timing of receipt of the request, and the status monitor 66 receives the thus transmitted status information (S24). Then, as shown in FIG. 3E, which indicates display of the status monitor when the retransmission is performed, the operating status of the printer 60a is changed to the "PRINT" state to the "SLEEP" state after the status monitor receives the status information. As such, in the status monitor 66, the operating status of the printer 60a can be monitored in a state close to the actual operating status of the printer 60a.

As mentioned above, there could be a case where the response-containing information contains maintenance information different from the particular maintenance information in addition to the status information as the differing information. Such maintenance information which is different from the particular maintenance information is to be transmitted to a program which is different from the application 30. Therefore, when the maintenance information which is different from the particular maintenance information is contained in the response-containing information, a similar re-transmission process, which is performed in a case where the status information is contained in the response-containing information, is performed.

When the unit data is neither the particular maintenance information nor the status information, the application 30 determines whether the unit data is the maintenance information. In this case, the application 30 determines whether the unit data is the response to the INFO command. When the unit data is the maintenance information, which is, for example, the information regarding the remaining amount of the toner, information indicating that the unit data is a response to the INFO command is contained in the unit data. Therefore, in such a case, it is determined that the unit data is the maintenance information. When the unit data is determined to be the maintenance information, the application 30 transmits the request requesting for data same as the unit data to the printer driver 32 using the INFO command That is, when the unit data is the information regarding the remaining amount of the toner, the application 30 transmits a request requesting for the information regarding the remaining amount of the toner to the printer driver 32 using the INFO command with the read-back refusal.

When receiving the requiring instruction requesting for information regarding the remaining amount of the toner using the INFO command with the read-back refusal, the printer driver 32 transmits a request, including the INFO command, for the information regarding the remaining amount of the toner to the printer 60a. Then, the printer 60a transmits the information regarding the remaining amount of the toner at a timing of receipt of the request. Since the request is transmitted with the read-back refusal, the printer driver 32 does not receive a response corresponding to the request, and the information regarding the remaining amount of the toner is received by the program which transmitted the request for the information. As above, the program can obtain the necessary maintenance information.

As described above, in accordance with an operation of the application 30, only the particular maintenance information contained in the response-containing information is stored in the storage area 38, while the information other than the particular maintenance information and contained in the response-containing information (i.e., the differing information) is re-requested (requested again) with the read-back refusal. Then, the particular maintenance information stored in the data storage are 38 is transmitted, in response to the request by the managing PC 50, to the managing PC 50. That is, the managing PC 50 is configured to transmit a request for the particular maintenance information to each of the managed PC's 10a, 10b and 10c at a particular period. Each of the managed PC's 10a, 10b and 10c transmits the particular maintenance information stored in the data storage area 38 to the PC 50 in response to receipt of the request from the managing PC 50. When receiving the particular maintenance information, the managing PC 50 stores the particular maintenance information with associating a sending managed PC 10a (10b or 10c) with the received particular maintenance information. As above, in the managing PC 50, the particular maintenance information of each of the managed PC's 10a, 10b and 10c is managed.

The process performed by the printer driver 32 described above is performed as the CPU 12 of the managed PC 10 executes the printer driver 32. Hereinafter, a process performed by the CPU 12 by executing the printer driver 32 will be described, referring to FIG. 4. It is noted that the flowchart shown in FIG. 4 is started in response to the printer driver 32 being started.

When the printer driver 32 is started, the printer driver 32 determines whether the input data is the target data (S100). When it is determined that the input data is the target data (S100: YES), the printer driver 32 generates the printing image data based on the target data and transmits the same to the printer 60a (S102). Then, the process shown in FIG. 4 is terminated.

When it is determined that the input data is not the target data (S100: NO), the printer driver 32 determines whether the input data is the request (S104). When it is determined that the input data is not the request (S104: NO), the printer driver 32 performs an error process (S106). Then, the process shown in FIG. 4 is terminated.

When it is determined that the input data is the request (S104: YES), the printer driver 32 analyzes the input data and extracts a keyword which is used to recognize the particular maintenance information (S108). Next, the printer driver 32 transmits a request corresponding to the requiring instruction to the printer 60a using the INFO command (S110). Then, the printer driver 32 determines whether the transmitted request was transmitted with the read-back request (S112). When it is determined that the transmitted requiring instruction was not one transmitted with the read-back request (S112: NO), that tis, when the request was transmitted with the read-back refusal, the present process is terminated.

When it is determined that the request is the instruction transmitted with the read-back request (S112: YES), the printer driver 32 receives the data from the printer 60a (S114). Next, the printer driver 32 analyzes the received data (S116) to determine whether the keyword extracted in S108 is contained in the received data (S118). When it is determined that the received data does not contain the keyword (S118: NO), the printer driver 32 returns to S114. When it is determined that the received data contains the keyword (S118: YES), the printer driver transmits the response-containing information to the application 30 (S120). Then, the process shown in FIG. 4 is terminated.

The process performed by the application 30 described above is performed as the CPU 12 of the managed PC 10 executes the application 30.

Next, referring to FIG. 5, a process when the CPU 12 executed the application 30 will be described. It is noted that the process shown in FIG. 5 starts in response to the application 30 being started up.

When the application 30 is started, the application 30 transmits the request of the particular maintenance information to the printer driver 30 with the read-back request at a particular timing (S130). Next, the application 30 determines whether the response-containing information is received from the printer driver 32 (S132). When it is determined that the application 30 has not received the response-containing information from the printer driver 32 (S132: NO), a process of S132 is repeated. When it is determined that the application 30 has received the response-containing information (S132: YES), the application 30 extracts a unit of data (i.e., the unit data) from the response-containing information (S134).

When extracting the unit data, the application 30 determines whether the unit data is the particular maintenance information (S136). When it is determined that the unit data is the particular maintenance information (S136: YES), the application 30 stores the unit data (i.e., the particular maintenance information) in the storage area 38 (S138). Then, the application 30 determines whether all pieces of the unit data contained in the response-containing information have been processed (S140). When it is determined that there remains unprocessed unit data which is contained in the response-containing information (S140: NO), the application 30 returns to S134 and processes the next piece of the unit data. When it is determined that all the pieces of unit data have been processed (S140: YES), the process shown in FIG. 5 is terminated.

When it is determined that the unit data is not the particular maintenance information (S136: NO), the application 30 determines whether or not the unit data is a response to the INFO command (S142). When it is determined that the unit data is the response to the INFO command (S142: YES), the application 30 transmits the request using the INFO command same as that of the unit data to the printer driver 32 with the read-back refusal (S144). Then, the application 30 performs steps of S140 onwards.

When it is determined that the unit data is not a response to the INFO command (S142: NO), the application 30 determines whether the unit data is the response to the USTATUS command (S146). When it is determined that the unit data is a response to the USTATUS command (S146: YES), the application 30 transmits, using the INFO command, the request requesting data same as the unit data to the printer driver 32 with the read-back refusal (S148). Then, the application 30 performs the process in steps S140 onwards. When it is determined that the unit data is not a response to the USTATUS command (S146: NO), the application 30 performs the process in S140 onwards. It is noted that the maintenance information stored in S138 is read out by the managing PC 50 in accordance with a known method. The managing PC 50 manages the printers 60a, 60b and 60c based on the maintenance information read out from the managed PC 10.

Second Embodiment

In the PC 10 according to the first embodiment, the retransmission process is performed by the application 30. In the PC 10 according to a second embodiment, the retransmission process is performed by the printer driver 32. The process performed by the printer driver 32 according to the second embodiment is the same as the process performed by the printer driver 32 according to the first embodiment except that the retransmission process is performed by the printer driver according to the second embodiment. Therefore, the same portions of the process performed by the printer driver 32 according to the first embodiment and performed by the printer driver 32 according to the second embodiment are omitted. It is noted that the printer driver 32 according to the second embodiment is configured to transmit a request for retransmission of the differing information to the printer 60 in the retransmission process, it is unnecessary to transmit the differing information to the application 30.

Because of the above configuration, the printer driver 32 according to the second embodiment transmits only the particular maintenance information (but not the response-containing information) to the application 30. Further, since the printer driver 32 transmits the request for retransmission of the differing information in accordance with the determination by itself, it is possible to prohibit re-reception of the differing information in accordance with the determination by itself. Therefore, the printer driver 32 according to the second embodiment does not perform processes regarding the read-back requirement. In the first embodiment, the application 30 transmits the requiring instruction of the particular maintenance information read-back request, while the application 30 transmits the requesting information of retransmission of the differing information with the read-back refusal. According to the second embodiment, the printer driver 32 transmits the request for the particular maintenance information and the request for retransmission of the differing information without designation of "with the read-back request" or "with the read-back refusal".

Further, according to the second embodiment, the application 30 transmits raw data of the PJL as input data of the request. Such a configuration can be employed since the input information and the information to be transmitted to the printer can be equalized since it is unnecessary to transmit the information regarding the read-back request/the read-back refusal according to the second embodiment. Since the application 30 receives not the response-containing information but only the particular maintenance information, upon receipt of the particular maintenance information, the application 30 stores the received particular maintenance information in the data storage area 38.

The process performed by the printer driver 32 according to the second embodiment will be described, referring to a flowchart shown in FIG. 6. Since steps S160-S168 and S172-S174 are the same as steps S100-S108, S114 and S116 of the flowchart shown in FIG. 4, description thereof will be omitted. In FIG. 4, after execution of S108, the request according to the request instruction is transmitted to the printer 60*a* using the INFO command According to the second embodiment, the input data is transmitted to the printer 60*a* as it is (S170). Then, in S174, the data received from the printer 60*a* is analyzed. Next, the printer driver 32 determines whether the received data contains the keyword extracted in S168 (S177). When it is determined that the keyword is contained in the received data (S177: YES), the printer driver 32 transmits the particular maintenance information to the application 30 (S178). When it is determined that that the keyword is not contained in the received data (S177: NO), the retransmission subroutine is executed (S176).

In the retransmission subroutine, the printer driver 32 determines whether the received data is a response to the INFO command (S192) as shown in FIG. 7. When it is determined that the received data is a response to the INFO command (S192: YES), the printer driver 32 transmits a request including the INFO command for requesting the same data as the received data to the printer 60 (S194). Then, the retransmission subroutine is terminated, and the process returns to S172.

When it is determined that the received data is not a response to the INFO command (S192: NO), the printer driver 32 determines whether the received data is a response to the USTATUS command (S196). When it is determined that the received data is the response to the USTATUS command (S196: YES), the printer driver 32 transmits a request, including the INFO command, for the data the same as the received data to the printer 60 (S198). Then, the retransmission execution subroutine is terminated, and the printer driver 32 returns to S172. When it is determined that the received data is not the response to the USTATUS command (S196: NO), the retransmission executing subroutine is terminated and control returns to S172.

A process performed by the application 30 according to the second embodiment will be described, referring to a flowchart shown in FIG. 8. In this process, the application 30 transmits the PJL command indicating the request of the particular maintenance information to the printer driver 32 (S200). Next, the application 30 determines whether the particular maintenance information has been received from the printer driver 32 (S202). When the particular maintenance information has not been received from the printer driver 32 (S202: NO), step S202 is repeated. When it is determined that the particular maintenance information has been received from the printer driver 32 (S202: YES), the application 30 stores the received particular maintenance information in the data storage area 38 (S204). Then, the process shown in FIG. 8 is terminated. It is noted that the information stored in S204 is read out by the managing PC 50 and is used for managing consumable items.

Third Embodiment

In the first and second embodiments, the application 30 is installed in the managed PC 10*a*, and, in response to the request from the application 30, the printer driver 32 transmits the request for the particular maintenance information to the printer 60*a*. In a printer system 70 according to a third embodiment, as shown in FIG. 9, an application 90 has been installed in the managing PC (which is an example of a managing device) 80, and the printer driver 32 transmits the request for the particular maintenance information to the printer 60*a* in response to the request transmitted by the application 90. It is noted that the printer driver 32 is configured such that the printer 60*a* is shared with the managing PC 80. Therefore, the printer driver 32 can operate in accordance with the instruction transmitted from the application 90 installed in the managing PC 80.

The process performed by the printer driver 32 according to the third embodiment is the same as the process performed by the printer driver 32 according to the second embodiment except that a transmission source of the request of the particular maintenance information and a transmission destination of the particular maintenance information is the application 90. Therefore, description on the process performed by the printer driver 32 according to the third embodiment is omitted.

The application 90 of the managing PC 80 transmits a request for the particular maintenance information to each of the managed PC's 10*a*, 10*b* and 10*c* at a particular period. The printer driver 32 of each of the managed PC's 10*a*, 10*b* and 10*c* transmits the particular maintenance information stored in the data storage area 38 to the application 90 in response to receipt of the request from the application 90. In response to receipt of the particular maintenance information, the application 90 stores the received particular maintenance information together with the transmission source managed PC in an associated manner. As above, the printer driver 32 of the managed PC 10 may obtain the particular maintenance information from the printer 60*a* in response to the request transmitted from the application 90 installed in the managing PC 80.

The process performed by the application 90 according to the third embodiment will be described, referring to a flowchart shown in FIG. 10. Firstly, the application 90 selects one of the managed PC's 10*a*, 10*b* and 10*c* (S210). Then, the application 90 selects one of the printers which is communicable with the selected managed PC 10 (S212). Next, the command transmission subroutine is executed (S214). The command transmission subroutine is the same as shown in FIG. 8, and description will be omitted.

After the command transmission subroutine is completed, the application 90 determines, in S216, whether the above-described process has been performed for all the printers which are communicable with the managed PC 10 selected in S210. When it is determined that the above-described process has not been performed for all the printers which are communicable with the managed PC 10 selected in S210 (S216: NO), control returns to S212. When it is determined that the above-described process has been performed for all the printers which are communicable with the managed PC 10 selected in S210 (S216: YES), the application 90 determines whether the process has been performed for all the managed PC's 10*a*, 10*b* and 10*c* (S218). When it is determined that the process has not been performed for all the managed PC's 10*a*, 10*b* and 10*c* (S218: NO), the application 90 returns to S210. When it is determined that the process has been performed for all the managed PC's 10*a*, 10*b* and 10*c* (S218: YES), the process shown in FIG. 10 is terminated.

According to the third embodiment, the process performed by the printer driver 32 is substantially the same as the process shown in FIG. 6, and description thereof is omitted. It is noted that, in the third embodiment, S178 of FIG. 6 has been modified such that the particular maintenance information is transmitted to the application 90 of the managing PC 80.

The processes of S100 and S160 performed by the CPU 12 are examples of a first receiving process and a first determining process, respectively. The processes of S102 and S162 performed by the CPU 12 are examples of a first transmitting process. The processes of S104 and S164 performed by the CPU 12 are examples of the first determining process. The processes of S110 and S170 performed by the CPU 12 are examples of a second transmitting process and a sixth transmitting process, respectively. The processes of S114 and S172 performed by the CPU 12 are examples of a second receiving process. The processes S118 and S190 performed by the CPU 12 are examples of a second determining process. The processes S120 and S179 performed by the CPU 12 are examples of a third transmitting process. The process S132 performed by the CPU 12 is an example of a third receiving process. The processes S142 and S146 performed by the CPU 12 are examples of a third determining process. The processes S144 and S148 performed by the CPU 12 are examples of a fifth transmitting process. The processes of S194 and S198 performed by the CPU 12 are examples of a fourth transmitting process.

It should be noted that aspects of the present disclosures need not be limited to the configurations of the above-described embodiments. The configurations described above can be modified/improved in various ways in accordance with knowledge of person skilled in the art. For example, in the embodiments described above, the INFO command and the USTATUS command are included in the request for various pieces of information. The commands included in the request need not be limited to the ones described above, but various commands may be included in such a request.

According to the above-described embodiments, the managed PC's 10 and the printers 60 are connected through the USB I/F's 22, respectively. Such a connection is only an example, and the managed PC's 10 and the printers 60 may be connected through Ethernet®, RS-232, Wi-Fi®, Bluetooth® and the like.

Further, according to the above-described embodiments, the Linux 34 is employed as an operating system. However, it is only an example, and any other operating systems may be employed if the CPUS 36 can be used as the printing system.

According to the above-described embodiments, the printer driver 32 determines whether or not the input data is the target data (FIG. 4, S100), and the printer driver 32 generates the print data and transmits the same to the printer when it is determined that the input data is the target data (S102). It is noted that such a configuration is only an example. For example, a different printer driver which is different from the printer driver 32 is prepared. Then, the different printer driver is configured to perform generating the print data from the target data and transmitting the generated print data to the printer, steps S100 and S102 can be omitted.

According to the above-described embodiments, the processes shown in FIGS. 4-8 and 10 are performed by the CPU 12. It is noted that the processes need not be performed by the CPU 12, but may be performed by an ASIC, other logical integrated circuits or a combination thereof.

What is claimed is:

1. A non-transitory computer-readable recording medium storing instructions for an information processing device provided with a controller and a communication interface through which the information processing device is connected to a printer, the instructions realizing a printer driver to be executed by the controller, a CUPS being runnable on the information processing device,
wherein the instructions cause, when executed, the controller to perform:
a first receiving process of receiving data from a particular application;
when the data received in the first receiving process is a request for particular data stored in the printer, a first transmitting process of transmitting a request for the particular data to the printer through a backend of the CUPS;
after transmission of the request for the particular data in the first transmitting process, a second receiving process of receiving data from the printer through the backend of the CUPS;
when the data is received in the second receiving process, a first determining process of determining whether the data as received is a response to the request for the particular data; and
when it is determined, in the first determining process, that the data is the response to the request for the particular data, a second transmitting process of transmitting the data received in the second receiving process to the particular application, and
wherein data is repeatedly received in the second receiving process until it is determined, in the first determining process, that the data as received is the response to the request for the particular data.

2. The non-transitory computer-readable recording medium according to claim 1,
wherein, when the data received in the first receiving process is target data to be printed by the printer, the controller performs a third transmitting process of transmitting the target data to the printer through the backend of the CUPS.

3. The non-transitory computer-readable recording medium according to claim 1,
wherein the instructions further cause the controller to perform the first receiving process and the second receiving process in association with the particular application running in the information processing device.

4. The non-transitory computer-readable recording medium according to claim 1,
wherein the communication interface is communicable with a managing device, and
wherein the instructions further cause the controller to:
share the printer with the managing device; and
perform the first receiving process and the second transmitting process in association with the particular application running in the managing device.

5. The non-transitory computer-readable recording medium according to claim 1,
wherein, when it is determined in the first determining process that the received data is not a response to the request for the particular data, the instructions cause the controller to perform a fourth transmitting process of transmitting a request for data same as the data determined not to be the response to the request for the particular data to the printer through the backend of the CUPS.

6. The non-transitory computer-readable recording medium according to claim 5,
wherein, in the first transmitting process, the controller transmits a first command which is a command requesting for the particular data and instructing retransmitting data at a timing of receipt of the request to the printer through the backend of the CUPS, and wherein, in the fourth transmitting process, when it is determined, in the first determining process, that the received data is not a response to the request for the particular data, and when it is determined that the data determined not to be the response to the request for the particular data is a response to a second command which is different from the first command, the controller is caused to transmit the first command requesting data same as the data determined not to be the response to the request for the particular data to the printer.

7. The non-transitory computer-readable recording medium according to claim 6,
wherein the particular application cause the controller to perform:
a third receiving process of receiving data transmitted in the second transmitting process;
a second determining process of determining whether there exists differing data which is different from the particular data among the received data received in the third receiving process; and
a fifth transmitting process in which, when it is determined that there exists the differing data in the second determining process, a request which requests for the same data as the differing data to the printer driver, and
wherein the instructions realizing the printer driver cause the controller to perform a sixth transmitting process in which, when the request transmitted in the fifth transmitting process is received, unnecessity-indicating information indicating unnecessity of reception together with a request for the data same as the differing data to the printer through the backend of the CUPS, and
wherein, in the second receiving process, the controller does not receive data transmitted from the printer in response to a request for data transmitted, in the sixth transmitting process, together with the unnecessity-indicating information, which the controller receives data transmitted from the printer in response to a request for data which is transmitted without being associated with the unnecessity-indicating information.

8. An information processing device, comprising:
a communication interface through which the information processing device is connected to a printer; and
a controller,
a CUPS being runnable on the information processing device,
wherein the controller is configured to perform:
a first receiving process of receiving data from a particular application;
when the data received in the first receiving process is a request for particular data stored in the printer, a first transmitting process of transmitting a request for particular data to the printer through a backend of the CUPS;
after transmission of the request for the particular data in the first transmitting process, a second receiving process of receiving data from the printer through the backend of the CUPS;
when the data is received in the second receiving process, a first determining process of determining whether the data as received is a response to the request for the particular data; and
when it is determined, in the first determining process, that the data as received is the response to the request for the particular data, a second transmitting process of transmitting the data received in the second receiving process to the particular application, and
wherein data is repeatedly received in the second receiving process until it is determined, in the first determining process, that the received data is the response to the request for the particular data.

9. A method of controlling an information processing device provided with a controller and a communication interface through which the information processing device is connected to a printer, the method realizing a printer driver to be executed by the controller, a CUPS being runnable on the information processing device,
wherein the method comprises:
a first receiving step of receiving data from a particular application;
when the data received in the first receiving step is a request for particular data stored in the printer, a first transmitting step of transmitting a request for the particular data to the printer through a backend of the CUPS;
after transmission of the request for the particular data in the first transmitting step, a second receiving step of receiving data from the printer through the backend of the CUPS;
when the data is received in the second receiving step, a first determining step of determining whether the data as received is a response to the request for the particular data; and
when it is determined, in the first determining step, that the data is the response to the request for the particular data, a second transmitting step of transmitting the data received in the second receiving step to the particular application, and
wherein data is repeatedly received in the second receiving step until it is determined, in the first determining step, that the data as received is the response to the request for the particular data.

* * * * *